Patented June 9, 1931

1,808,831

UNITED STATES PATENT OFFICE

HENRY L. BORG, OF STAMFORD, CONNECTICUT, ASSIGNOR TO POSTUM COMPANY, INCORPORATED, OF BATTLE CREEK, MICHIGAN, A CORPORATION OF DELAWARE

PROCESS FOR RECOVERING FATTY PRODUCTS

No Drawing. Application filed January 21, 1928. Serial No. 248,573.

This invention relates to a process for recovering fats and more particularly to a process for recovering the fat of cacao beans.

Great care is employed in selecting cacao beans used in chocolate manufacture. The rejected beans, as well as the dust from the fanners and crackers employed in chocolate manufacture, contain a large percentage of fats which are very valuable. It has heretofore been proposed to recover this fat by cooking these products, which are unsuited for chocolate manufacture, in boiling water. After the mass had been cooked it was necessary to let it stand for two or three days in order to permit the fat to rise to the top of the cooked mass. This process was unsatisfactory since a relatively small amount of the total fat contained in the substances treated was removed. In order to increase the amount of fat removed, the cooked substances were, in certain instances, subjected to heavy pressure, and all but approximately 5% of the fat could then be removed. This cooking and pressing process involves considerable time and expense and, as pointed out, is ineffective to remove all the fat.

An object of the present invention is to provide a novel process whereby the fatty products contained in cacao beans, and particularly rejected beans, and the dust from fanners and crackers for the cacao beans, may be expeditiously removed so that all but approximately 1% of the contained fat is recovered. The substances to be treated in accordance with the present process should contain 30% or more of fatty products.

In carrying out the process the cacao beans, which are unsatisfactory for use in chocolate manufacture, together with the dust, if desired, are ground as fine as possible and for this purpose an iron ball mill of any suitable type may be employed. After grinding, the mass is now in a liquid state, and is run into a steam jacketed tank provided with a slow running agitator. Preferably, the speed of the agitator is approximately six revolutions per minute, since if too great a speed is employed the fatty substances are emulsified and absorbed by or blended with the cocoa matter.

To the liquid mass in the tank is added an amount of water equal to approximately 12% by weight of the liquid mass run into the tank. The temperature of the tank is now brought to 100° C. and maintained at this temperature while the mass is agitated for approximately three hours. By this treatment the oil is freed from the tissues of the mass. At the end of the period specified, boiling water, in an amount by weight equal to the mass in the tank, is added and this mass is agitated from five to ten minutes, depending on the amount of fatty substances present. Preferably, the same speed of the agitator is employed as in the first instance.

The cocoa mass thus treated is allowed to settle for approximately one hour. The larger portion of the fat contained therein will rise to the top and can be removed by siphoning. The remainder of the mass in the tank is now placed in a centrifugal machine to separate the solid matter from the fats and water. The fatty substances thus removed, together with the fat siphoned off, is placed in an oil separator to remove the water. The solid residue remaining in the centrifugal machine is dried in a rotary dryer and may be used for cattle feed or fertilizer since it contains salts and nitrogen.

Particular attention must be given to the amount of water used in carrying out the process. Only sufficient water to cause the starches to swell up and form a paste (gelatinize the starches) must be employed, in order for the oil or fatty substances to be freed from the tissues of the mass. Sufficient water must not be used to permit the starches to go into solution. As pointed out above, the substances to be treated in accordance with this process must contain at least 30% fat. Cocoa powder or press cake cannot be subjected, satisfactorily, to this process due to the low percentage of fat contained therein and the relatively high percentage of starches, since in order to cause the starches to swell up and form a paste such a great quantity of water would have to be employed as would result in emulsifying the fat. The starchy solution would hold the cocoa butter in suspension, so that the fatty products could only be removed by pressing.

In the cooking process heretofore employed, a gelatinous mass is obtained with the fat distributed equally throughout the same, but by means of the present process the fat is liberated or freed and is readily removed. It has been found that all but 8/10 of 1% (0.8%) of the fat may be satisfactorily removed by my process, and this in an inexpensive and rapid manner.

The rejected cacao beans, including the hulls, are converted into valuable products. The temperature and time specified in the process may be varied but particular care must be taken in varying the amount of water used in order to prevent emulsifying and suspension of the fatty products.

Reference will be had to the appended claims for a definition of the limits of the invention.

What is claimed is:—

1. A process for recovering fatty substances from fat-containing materials of vegetable origin which consists in subjecting a mass containing not less than approximately 30% of fatty substances to a temperature of approximately 100° C. while slowly agitating the mass in the presence of approximately 12% by weight of water, adding boiling water in an amount by weight approximately equal to the mass being treated, again agitating the mass, permitting the mass to settle, and separating the solids and water from the fatty substances.

2. A process for recovering fatty substances from fat-containing materials of vegetable origin which consists in subjecting a finely divided mass containing solid and fatty constituents, the percentage of said fatty constituents being approximately 30% or more of the total mass, to a temperature of approximately 100° C., while slowly agitating the mass in the presence of sufficient water to gelatinize the starches in the mass, adding boiling water in an amount by weight approximately equal to the mass being treated, again agitating the mass, permitting the mass to cool and settle, and then separating the solids and water from the fatty substances.

3. A process for recovering cocoa fat which consists in finely dividing a cocoa mass containing not less than approximately 30% of fatty substances, subjecting the ground mass to a temperature of approximately 100° C. in the presence of approximately 12% by weight of water, agitating the heated mass for approximately three hours, then adding boiling water in an amount by weight approximately equal to the mass being treated, then agitating the mass for approximately five minutes, permitting the mass to settle, removing water and fatty substances from the top of the settled mass, separating the solid matter from the remaining mass, and separating the fatty substances and water.

4. A process for recovering cocoa butter from a finely divided cocoa mass containing not less than 30% of butter, which consists in maintaining said mass at a temperature of substantially 100° C. while the mass is slowly agitated in the presence of approximately 12% of water, adding an equal amount, by weight, of boiling water to the mass, slowly agitating the mixture, permitting the mixture to cool and settle, and centrifugally separating the butter.

5. In a process for treating a finely divided cacao bean mass which contains not less than approximately 30% of cocoa butter, whereby said butter may be removed from the solid constituents of the mass, which includes the step of slowly agitating the mass in the presence of approximately 12% by weight of water while maintaining the mass at a temperature of approximately 100° C.

In testimony whereof I have signed this specification.

HENRY L. BORG.

CERTIFICATE OF CORRECTION.

Patent No. 1,808,831.  Granted June 9, 1931, to

HENRY L. BORG.

It is hereby certified that the above numbered patent was erroneously issued to "Postum Company, Incorporated", whereas said patent should have been issued to General Foods Corporation, of Battle Creek, Michigan, a corporation of Delaware, said corporation being assignee of the entire interest in said invention, as shown by the records of assignments in this office; and that the said Letters Patent should be read with this correction therein that the same may conform to the record of the case in the Patent Office.

Signed and sealed this 29th day of September, A. D. 1931.

(Seal)

M. J. Moore,
Acting Commissioner of Patents.